Dec. 9, 1969     H. G. LEHMANN     3,482,291
QUICK-RELEASE UNIVERSAL-MOVEMENT COUPLING
Filed Aug. 11, 1967     2 Sheets-Sheet 2
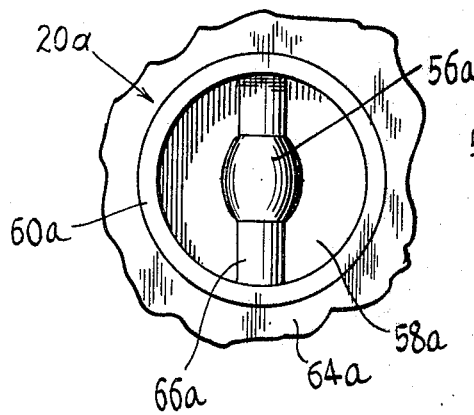
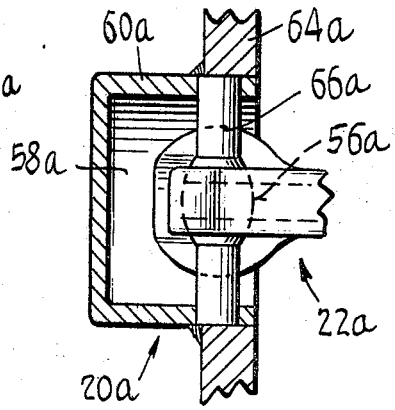
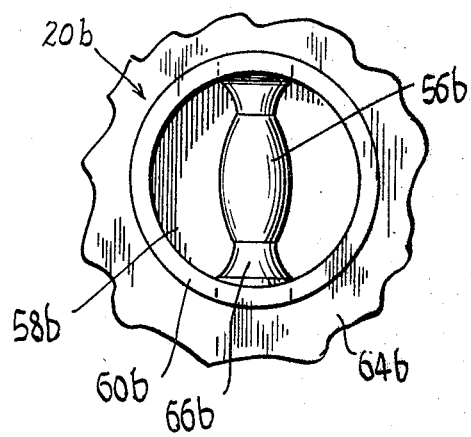
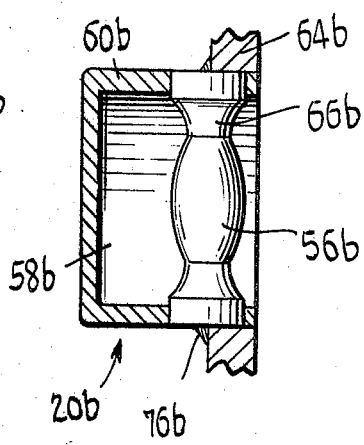
INVENTOR.
Herbert G. Lehmann
BY
AGENT

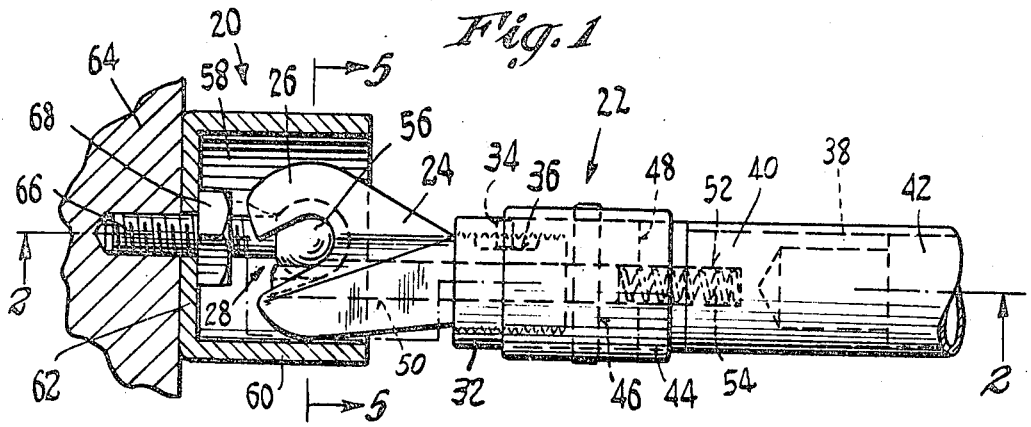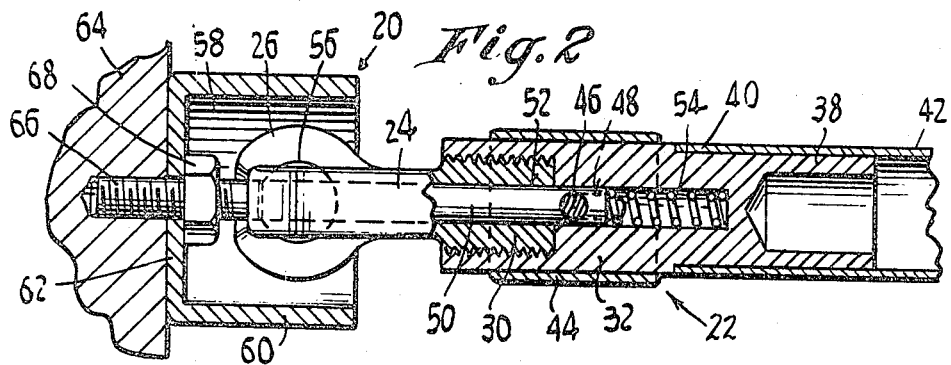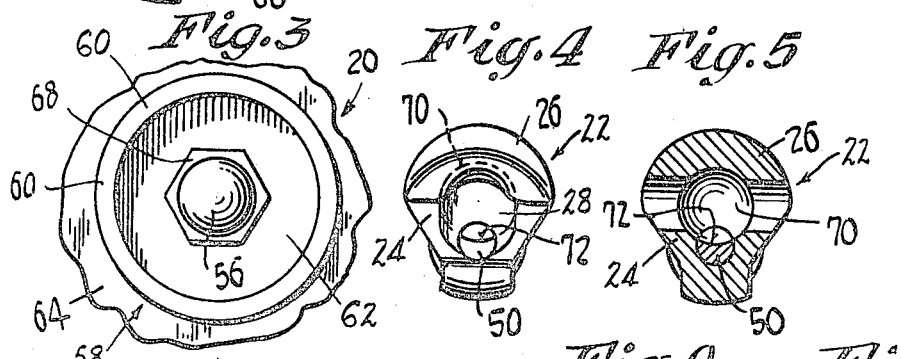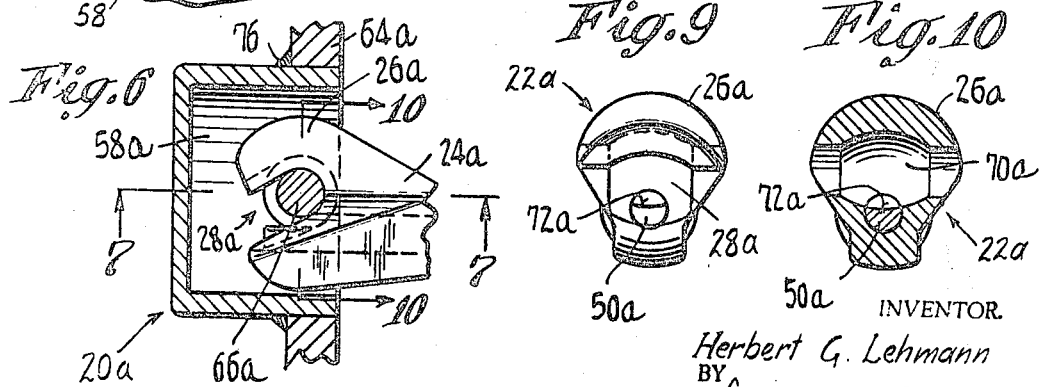

United States Patent Office 3,482,291
Patented Dec. 9, 1969

3,482,291
QUICK-RELEASE UNIVERSAL-MOVEMENT COUPLING
Herbert G. Lehmann, Easton, Conn., assignor to Norco, Inc., Ridgefield, Conn., a corporation of Connecticut
Filed Aug. 11, 1967, Ser. No. 663,193
Int. Cl. F16b 21/00, 9/02
U.S. Cl. 24—230     10 Claims

ABSTRACT OF THE DISCLOSURE

A quick-release coupling comprising cooperable plug and socket parts. The plug part has an elongate jaw member provided, adjacent one end, with a socket and carrying a locking slide movable into and out of the socket. The socket part comprises a stud having a bulbous head portion which is receivable in the socket and is releasably held captive by the slide. The socket of the jaw member has a dished or cup-like inner configuration which fits around the bulbous head in a manner that the coupling parts can have limited relative universal movement.

CROSS REFERENCES (1) U.S. Patent No. 2,560,513, (2) U.S. Patent No. 2,674,774, (3) U.S. Patent No. 2,948,383, (4) U.S. Patent No. 3,253,310, (5) U.S. Patent No. 3,280,439.

BACKGROUND

This invention relates to quick-release couplings or fasteners, and more particularly to devices of this type which embody cooperable receiver and plug parts.

In some prior couplings of the kind indicated, the receiver part included a cylindrical rod or cross bar which was received and held captive in a locking jaw member of the plug part. Some limited swivel or pivotal action was possible, about one given axis. In other prior couplings a shouldered socket received a plug part which included a cooperable shoulder or locking piece engageable with the shoulder portion of the socket. Relative turning movement was possible, but substantially no swiveling or pivotal movement. The limitations on movement of these prior devices required quite accurate orientations of the parts to effect their securement, or to permit quick and easy release, and under adverse conditions of use this could sometimes result in a distinct disadvantage.

SUMMARY

The present invention obviates the above drawbacks and disadvantages of prior quick-release couplings, and objects of the invention include the provision of a novel and improved separable coupling wherein prior orientation of the parts is not especially critical, or orientation after joining, thereby to facilitate the quick and easy securement of the parts to each other, and also the quick and easy separation of the parts when these conditions are desired. This is accomplished by the provision of coupling parts which are so arranged as to permit appreciable relative universal movement to occur between them. In the illustrated embodiments of the invention one part includes a stud having a bulbous head portion, and the cooperable jaw-carrying part has a dished socket configuration for accommodating the bulbous head whereby the parts are capable of limited relative universal pivotal or swivelling movement when joined together. No extraordinary binding occurs to hinder separation of the parts, nor is perfect alignment required to effect the joining.

Other objects and advantages are to provide an improved releasable coupling as above set forth, which is simple in construction, economical to produce, small and compact, sturdy, powerful and reliable in operation, relatively trouble-free, and easily operated even under adverse conditions of use.

Other features and advantages will hereinafter appear.

In the drawings:

FIG. 1 is a view partly in axial section, and partly in side elevation, of the improved quick-release coupling as provided by the invention.

FIG. 2 is an axial sectional view, taken on the line 2—2 of FIG. 1.

FIG. 3 is a front elevational view of the receiver part of the coupling.

FIG. 4 is a front elevational view of the plug part of the coupling.

FIG. 5 is a transverse sectional view of the coupling plug part, taken on the line 5—5 of FIG. 1.

FIG. 6 is a fragmentary view partly in axial section and partly in side elevation, of a quick-release coupling constituting a modification of the invention.

FIG. 7 is a sectional view, taken on the line 7—7 of FIG. 6.

FIG. 8 is a front plan view of the receiver part of the coupling of FIGS. 6 and 7.

FIG. 9 is a front elevational view of the plug part of the coupling of FIGS. 6 and 7.

FIG. 10 is a transverse section through the plug part of the coupling, taken on the line 10—10 of FIG. 6.

FIG. 11 is an axial sectional view of a receiver part of a coupling constituting yet another embodiment of the invention.

FIG. 12 is a front plan view of the receiver part of FIG. 11.

Considering first FIGS. 1–5, the receiver part of the coupling is indicated generally by the numeral 20, the plug part of the coupling being designated generally by the numeral 22. The plug part 22 comprises an elongate jaw body 24 having a socket portion 26 at one end, providing a socket 28. The jaw body 24 has a threaded shank 30 which is screwed into an adapter piece 32 and locked thereto by a pin 34 accommodated in a slot 36 extending longitudinally in the shank 30.

The adapter piece 32 has an end portion 38 of reduced diameter, over which there is secured one end 40 of a tubular strut member 42. The adapter piece 32 slidably carries an exposed, manually operable release sleeve 44 having a cross pin 46 passing through slots 48 in the piece 32 as seen in FIGS. 1 and 2.

The jaw body or member 24 slidably carries a locking bar or slide 50 disposed in a central bore 52 of the piece 32, said bore also accommodating a spring 54 which bears against the inner or rearward end of the slide 50 and biases the latter from right to left. The cross pin 46 passes through the locking slide 50 and enables the latter to be manually actuated by force applied to the release sleeve 44.

The forward end of the slide 50 is movable into and out of the socket 28, thereby to hold captive or to release a coupling head 56 which is carried by the receiver part 20. As seen in FIGS. 1 and 2, the head 56 is being held captive by the slide 50. When the slide is shifted from left to right, or retracted, as by similar movement imparted to the release sleeve 44, the slot 28 will be cleared so as to enable the coupling head 56 to be withdrawn from the jaw body 24 and socket 28 thereof.

The receiver part 20 as shown in FIGS. 1–3 comprises a cup-shaped member 58 having side walls 60 and a bottom wall 62. The receiver cup 58 is carried on a supporting structure 64 so as to be rigid therewith. For this purpose, the coupling head 56 is shown as having a threaded shank 66 which is screwed into a suitable threaded hole in the structure 64, said shank passing through an aperture in the bottom wall 62 of the cup 58.

A lock nut 68 may be utilized to effect the securement.

In accordance with the present invention, the coupling parts 20, 22 are so organized and constituted as to have a certain amount of universal movement, thereby facilitating the joining of the coupling parts and also the separation of said parts whenever these operations are desired. The stud portion 56 is constituted as a bulbous head, being shown as spherical in configuration, and the socket portion 26 of the jaw member 24 has a dished inner wall 70 adapted to substantially fit and receive the bulbous head 56 of the receiver part. Also, the locking slide 50 is shown as having a side recess 72 adapted to likewise accommodate the bulbous head 56 of the receiver part 20. With such organization, there is in effect a ball-and-socket joint which permits limited universal movement between the coupling parts 20, 22 while at the same time securely locking said parts to each other and enabling the parts to be easily and quickly separated as the occasion demands.

It will be understood from an inspection of FIGS. 1 and 2 that the plug part 22 can swivel or pivot in all different directions with respect to the receiver part 20. Accordingly, no extraordinary binding between the parts will occur due to a shift in their relative positions, which shift with other constructions might result in difficulty in effecting quick release of the parts. Likewise, when it is desired to join the parts 20, 22 to each other, it is not necessary to first effect an accurate or critical initial orientation of the parts prior to their being coupled. Instead, the plug part 22 can be readily first accommodated in the receiver shell 58 which constitutes a guide for the plug part, and the latter can readily immediately accommodate the bulbous head 56 of the receiver stud even though the plug part 22 is out of perfect alignment with respect to the axis of the receiver part 20. Notwithstanding the universal movement which is possible between the plug and receiver parts 22, 20, it will be seen that the locking slide 50 effectively holds captive the bulbous head 56 of the receiver part at all times. It is only when the locking slide 50 is retracted or shifted from left to right, that the plug part 22 can be withdrawn from the receiver part 20 by virtue of the bulbous head 56 leaving the socket 28. Thus, a positive lock is effected between the coupling parts even though these can have a substantial amount of relative or universal movement.

Another embodiment of the invention is illustrated in FIGS. 6–7. Here, the receiver part comprises a cup 58a mounted to be flush in a supporting panel 64a, being secured thereto by a welding fillet 76. The receiver cup 58a has a cross pin or stud 66a carried in its side walls 60a. The stud 66a has a central enlargement or bulbous head portion 56a which is accommodated in the socket 28a of the portion 26a of the jaw member 24a.

It will be noted that the enlargement or bulbous head 56a is not truly spherical but instead of elongate configuration, and that the strut 66a carries the head intermediate its ends, said stud being anchored in the side walls of the shell 60a. These details represent the essential differences between the embodiment of FIGS. 6–10 and that of FIGS. 1–5, in addition to the flush mounting of the cup 60a in the support 64a. In keeping with the non-spherical configuration of the bulbous head 56a, the socket 28a of the jaw member 24a has a somewhat similar elongate configuration, and as indicated at 70a in FIGS. 9 and 10, the locking slide 50a likewise has a recess 72a arranged to loosely fit the bulbous head 56a. By effecting a slight mismatch between the bulbous head 56a on the one hand, and the socket configurations 70a, 72a on the other hand, resulting in a clearance at the opposite smaller-diameter end portions of the head, it is possible for the jaw member 24a to very easily have a limited universal movement with respect to the receiver part 20a, in addition to the free swivelling or pivotal movement of the plug part 22a transevrsely of the axis of the cross pin 66a.

Still another embodiment of the invention is illustrated in FIGS. 11 and 12, wherein the receiver part 20b comprises a cup member 58b having side walls 60b in which there is carried a cross pin 66b. The cross pin 66b has a bulbous head or enlargement 56b intermediate its ends, characterized by a configuration which is still further removed from a true spherical shape. The bulbous head 56b is seen to be more elongate and of lesser diameter than the bulbous head 56a, this same being true of the head 56a as compared with the spherical bulbous head 56.

The receiver cup 58b is fitted flush with the supporting panel 64b, being welded thereto by a welding fillet 76b as shown.

The operation of the forms of the invention illustrated respectively in FIGS. 6–10 and 11, 12 is generally similar to that described in FIGS. 1–5, as regards the securement and separation of the coupling parts, the limited universal movement of said parts, and the lack or elimination of the necessity for the parts to be accurately aligned or oriented in order to enable quick attachment and separation to be effected.

In all forms of the invention the coupling is seen to comprise relatively few components, which may be economically fabricated and assembled. The coupling is strong and sturdy, small and compact, and extremely effective for the intended purposes.

Variations and modifications may be made within the scope of the invention, and portions of the improvement may be used without others.

I claim:

1. A quick-release universal-movement coupling comprising, in combination:
   (a) a plug part including an elongate jaw body having a socket adjacent one end, the widest portion of said socket constituting a mouth which opens at the end of the jaw body,
   (b) a slide carried by said body, movable into and out of said socket to hold captive or release a coupling head carried in said socket,
   (c) a receiver part, including a stud,
   (d) a bulbous head on said stud, receivable through the mouth of the socket into the latter,
   (e) said socket having a dished inner wall adapted to substantially fit and receive the bulbous head of the receiver part, wherein the improvement comprises:
   (f) said receiver part including guide means comprising a shell surrounding the stud and head, engageable with the plug part to guide the same into the receiver part.

2. A coupling as in claim 1, wherein:
   (a) the shell has a cup-like configuration, the bottom wall of said shell mounting said receiver stud.

3. A coupling as in claim 2, wherein:
   (a) the bulbous head of the stud is disposed at one end thereof,
   (b) said head being of substantially spherical configuration.

4. A coupling as in claim 1, wherein:
   (a) said shell having a cup-like configuration, a side wall of which mounts said receiver stud.

5. A coupling as in claim 4, wherein:
   (a) the bulbous head of the stud is disposed intermediate the ends thereof,
   (b) both end portions of the stud being mounted on the side wall of the shell.

6. A coupling as in claim 1, wherein:
   (a) the slide comprises a round rod having a recess in one side for receiving a portion of said bulbous head.

7. A plug part for a quick-release universal-movement coupling comprising, in combination:
   (a) an elongate jaw body having a socket adjacent one end, the widest portion of said socket constituting a mouth which opens at the end of the jaw body,
   (b) a slide carried by said body, movable into and out of said socket to hold captive or release a balbous coupling head of a cooperable receiver part carried in said socket, (c) said socket having a dished inner wall including an end wall, said end wall including an opening smaller than said socket through which the slide extends, adapted to substantially fit and receive said bulbous coupling head, (d) said slide comprising a round rod having a recess in one side, for receiving a portion of said bulbous head.

8. A receiver part for a quick-release universal-movement coupling comprising, in combination:

(a) a socket of dished configuration, having cylindrical sides and a transverse bottom wall, (b) a stud carried in said socket, (c) a bulbous head on said stud, disposed centrally in said socket, (d) said stud being carried by said socket, (e) the bulbous head of the stud being disposed within the cylindrical socket walls and spaced closely with respect thereto for receiving with a minimum of clearance a plug part adapted to encircle and grip said bulbous head, (f) said cylindrical socket walls projecting beyond the stud and bulbous head thereof and constituting a guide for centering the plug part when the latter is being applied to the bulbous head, (g) a cooperable part having a substantially spherical socket in which the bulbous head of the stud is releasably received, said cooperable part having a locking slide engageable with the head to lock the part thereto, said stud and part having limited relative universal movement.

9. A coupling as in claim 8, wherein:

(a) the bulbous head of the stud is disposed intermediate the ends thereof, (b) said stud being carried by side walls of the socket.

10. A quick-release universal-movement coupling comprising, in combination:

(a) a plug part including an elongate jaw body having a socket adjacent one end, the widest portion of said socket constituting a mouth which opens at the end of the jaw body, (b) a slide carried by said body, movable into and out of said socket to hold captive or release a coupling head carried in said socket, (c) a receiver part, including a stud, (d) a bulbous head on said stud, receivable through the mouth of the socket into the latter, (e) said socket having a dished inner wall adapted to substantially fit and receive the bulbous head of the receiver part, wherein the improvement comprises:

(f) said slide comprising a round rod having a recess in one side, for receiving a portion of said bulbous, head, (g) a cylindrical member surrounding the bulbous head in spaced relation thereto and projecting beyond the head to constitute a guide.

References Cited

UNITED STATES PATENTS

| | | | |
|---|---|---|---|
| 372,166 | 10/1887 | Munroe | 287—89 X |
| 734,998 | 7/1903 | Thompson | 287—89 X |
| 2,305,234 | 12/1942 | Bratz. | |
| 3,378,891 | 4/1968 | Metz. | |
| 2,424,409 | 7/1947 | Meyer | 287—89 |
| 2,577,817 | 12/1951 | Schueder. | |
| 3,148,909 | 9/1964 | Tantlinger. | |
| 3,263,638 | 8/1966 | Cressman. | |
| 2,782,391 | 2/1957 | Kirk | 339—94 X |
| 2,958,843 | 11/1960 | Long | 339—94 X |
| 3,133,777 | 5/1964 | Anhalt | 24—217 X |
| 3,332,117 | 7/1967 | McCarthy. | |

BERNARD A. GELAK, Primary Examiner

U.S. Cl. X.R.

24—211, 219; 287—21